Patented Feb. 27, 1923.

1,446,914

UNITED STATES PATENT OFFICE.

FRED E. LINGAFELTER AND GAYLORD S. HECK, OF MANSFIELD, OHIO.

ART OF FORCING FISH BAIT, WORMS, ETC., OUT OF THE EARTH.

No Drawing.  Application filed January 19, 1921.  Serial No. 438,466.

*To all whom it may concern:*

Be it known that we, FRED E. LINGAFELTER and GAYLORD S. HECK, citizens of the United States, each residing at Mansfield, in the county of Richland and State of Ohio, have invented a new and useful Improvement in the Art of Forcing Fish Bait, Worms, Etc., Out of the Earth, of which the following is a specification.

The present invention relates to a process of forcing fish and turtle bait animals, such as angleworms, fishworms, earthworms, night crawlers, etc., which are in or near the surface of the earth, to come to its surface, where they can readily be captured, and will be fully understood from the following description thereof, in which the details of a specific method of procedure are set forth.

We have discovered that the application to the earth and the impregnation of its surface for a suitable depth with dilute solutions of soluble sulfides, and more particularly of calcium sulfides and polysulfides, renders the treated earth substantially uninhabitable by angleworms, fishworms and like animals of the character above set forth. The solution employed has no injurious or harmful effect upon vegetation and may hence be employed, for example, on ground covered with grass, etc.

In accordance with the present invention we may employ a solution containing calcium polysulfides, said solution being very dilute and containing, for example, from 0.01 to 1% of calcium polysulfides. This solution may be conveniently prepared, for example, by dissolving in water a suitable proportion of a standard lime-sulphur spraying solution containing from 27 to 33% calcium polysulfide (calculated as calcium pentasulfide). Thus, by dissolving the liquid in water in the proportion of one tablespoonful per gallon, a solution suitable for use in accordance with the present invention and containing about 0.03% calcium polysulfide is obtained.

In using the solution prepared as above described, it is poured on the ground out of which it is desired to drive the fishworms, angleworms, or other creatures of the character above set forth. Three or four gallons are ordinarily sufficient, although in dry weather a larger quantity is required. In cool weather the use of luke-warm water is advantageous. After a short time the worms crawl out of the earth and attempt to reach an untreated area. While on the surface they may be readily captured.

The dilute solution utilized has no deleterious effect upon vegetation and may hence be freely used on areas covered with grass or other vegetation. The efficacy of the liquid is probably due to a slight irritant action on the skins of the worms, or to the effect of the sulfide fumes. We do not intend however that these hypotheses as to the action of the liquid shall be regarded as limitations upon the scope of this invention, and we further intend that substances having an equivalent action shall be included within the scope of the present claims. It is furthermore readily apparent that, if desired, any suitable pigment may be incorporated in the material.

We claim:

1. The process of forcing worms and the like to seek the surface of the earth which comprises impregnating the surface of the earth with a dilute aqueous solution of calcium polysulfides containing from 0.01 to 1% of calcium polysulfides.

2. The process of forcing worms and the like to seek the surface of the earth which comprises pouring upon the earth a solution of lime-sulfur spray liquid in water in the proportion of about one tablespoonful per gallon.

FRED E. LINGAFELTER.
GAYLORD S. HECK.